(12) United States Patent
Shapiro et al.

(10) Patent No.: US 7,840,802 B1
(45) Date of Patent: *Nov. 23, 2010

(54) CONTROLLING ACCESS TO ELECTRONIC DOCUMENTS

(75) Inventors: William M. Shapiro, Palo Alto, CA (US); James Donahue, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 182 days.

This patent is subject to a terminal disclaimer.

(21) Appl. No.: 12/027,981

(22) Filed: Feb. 7, 2008

Related U.S. Application Data

(63) Continuation of application No. 10/659,874, filed on Sep. 9, 2003, now Pat. No. 7,434,048.

(51) Int. Cl.
*H04L 29/06* (2006.01)
(52) U.S. Cl. .................... 713/165; 713/171; 726/2
(58) Field of Classification Search .............. 713/1, 713/2, 188, 194, 165, 171; 380/200, 201, 380/255, 277; 726/2
See application file for complete search history.

(56) References Cited

U.S. PATENT DOCUMENTS

| | | | |
|---|---|---|---|
| 6,289,450 B1 | 9/2001 | Pensak et al. | |
| 6,339,825 B2 | 1/2002 | Pensak et al. | |
| 6,449,721 B1 | 9/2002 | Pensak et al. | |
| 2002/0194485 A1* | 12/2002 | Ram et al. | 713/193 |
| 2003/0200459 A1 | 10/2003 | Seeman | |
| 2003/0237005 A1* | 12/2003 | Bar-Or et al. | 713/201 |
| 2004/0054894 A1 | 3/2004 | Lambert | |
| 2004/0078569 A1 | 4/2004 | Hotti | |
| 2004/0117655 A1* | 6/2004 | Someshwar | 713/201 |
| 2004/0133632 A1 | 7/2004 | Messerges et al. | |

* cited by examiner

*Primary Examiner*—Kimyen Vu
*Assistant Examiner*—Joseph Pan
(74) *Attorney, Agent, or Firm*—Fish & Richardson P.C.

(57) ABSTRACT

Methods and apparatus, including computer program products, for controlling access to an electronic document. A document management system receives a request from a first user at a first user location for an electronic document. The first user is authenticated using a set of access policies for the electronic document, to verify that the first user is authorized to obtain the electronic document. If so, an encrypted rendition is passed to the first user. A request for access to the encrypted rendition from a second user is then received. The second user is authenticated, using the set of access policies, to establish which operations the second user may perform on the encrypted rendition. A voucher including an electronic key for decrypting the encrypted rendition and the set of access policies is created at the document management system. The voucher is passed to the second user location.

21 Claims, 3 Drawing Sheets ures, a Word® rendition in a Macintosh® format, an Adobe® Acrobat® PDF (Portable Document Format) rendition, and an HTML rendition with associated image files. Furthermore, a rendition of an electronic document does not necessarily have to correspond to a single file. A rendition of an electronic document may be stored in a portion of a file that holds other electronic documents (or renditions), in a single file dedicated to the electronic document in question, or in multiple coordinated files.
CONTROLLING ACCESS TO ELECTRONIC DOCUMENTS

CROSS-REFERENCE TO RELATED APPLICATIONS

This application is a continuation application and claims the benefit of priority under 35 USC §120 of U.S. application Ser. No. 10/659,874, filed on Sep. 9, 2003.

BACKGROUND

The present invention relates to management of electronic documents in a document management system.

Document management systems often store sensitive electronic documents and provide sophisticated control over who can access the electronic documents, for example, within an enterprise. One example of a document management system is the Documentum® Enterprise Content Management platform, offered by Documentum Inc. of Pleasanton, Calif. The electronic documents may often contain sensitive information, such as financial data, trade secrets, and so on.

An electronic document can have many renditions. A rendition is an instance of an electronic document, and includes a representation of some or all of the content of the electronic document. Typically, each rendition of a document differs in its format. For example, an electronic document may have a Microsoft® Word® rendition, a Word® rendition in a Macintosh® format, an Adobe® Acrobat® PDF (Portable Document Format) rendition, and an HTML rendition with associated image files. Furthermore, a rendition of an electronic document does not necessarily have to correspond to a single file. A rendition of an electronic document may be stored in a portion of a file that holds other electronic documents (or renditions), in a single file dedicated to the electronic document in question, or in multiple coordinated files.

In a typical document management system, the electronic documents are stored in a document repository. A document repository is a secure computer storage location, such as a server, in which a library of renditions of electronic documents is kept and maintained in an organized way, so that the renditions can be accessed and searched efficiently, regardless of the source or format of the individual renditions in the library. The library can be maintained in different types of secure computer storage—for example, a set of protected directories in a server host's file system or an external storage facility, a relational database management system (RDBMS), a content-addressed storage device, or an external storage area, such as a legacy system. A document repository can also be an abstract repository that encompasses a number of distinct distributed physical resources in which the library of electronic documents is stored. For example, a global company might have a document repository that encompasses physical storage located in each geographical region, with the goal of storing the electronic documents locally to the users who work on them, such that universal access is provided while the document management system performance is preserved. The renditions of the electronic documents in the document repository are accessible to multiple users, subject to access control. Each electronic document in the document repository is represented by an object and associated content. The object is identified by a document identifier (ID), which typically is the same for all the renditions of the electronic document. Each document ID is associated with access control information, such as an Access Control List (ACL) that governs access to the electronic document and describes which users are allowed to access the electronic document. The access control information is thus shared between the different renditions of the electronic document, and is separate from the electronic document itself.

In a document management system, when a user tries to access a rendition of an electronic document (which typically means downloading the rendition to his computer), the document management system first verifies that the user is authorized to access the electronic document against a set of access policies. The access control can, for example, be performed by first authenticating the user to confirm the user's identity, and then verifying the user identity against the ACL for the requested electronic document. If the user is authorized to access the electronic document, a rendition of the electronic document is sent to the user and the user is then free to access the content of the rendition.

Once an authorized user accesses a rendition of an electronic document from the document repository and makes a local copy of the rendition, typically, much—or even all—control of the rights pertaining to the electronic document is lost. For example, after making a local copy of the rendition, the user can e-mail the rendition to other, unauthorized, users, without regard to the access control mechanisms of the document management system.

In one attempt to solve this problem, a document security system has been provided in which the security of the electronic documents is governed by a set of rights management policies that is established and administered separately from any policies associated with a document management system. The rights management policies govern, for example, who can access an electronic document, dates and times when a particular electronic document can be accessed, a particular IP address or computer network from which an electronic document can be accessed, whether printing/copying/pasting of the electronic document is allowed, and so on. Since a separate set of rights management policies is used in the document security system, the electronic documents may be stored at any accessible location and does not have to reside in a document management system. The rights management policies are stored on a separate policy server in the document security system. In addition, the policy server stores document encryption and decryption keys, user identities, and logs activities in the document security system. However, no electronic documents are stored on the policy server.

When a document author registers an electronic document in the document security system, he can create a set of rights management policies for the electronic document. Before storing the document at a desired storage location, he encrypts the document with a symmetric encryption key that is issued to him by the policy server. A copy of the key is kept at the policy server, where it is associated with an identifier for the electronic document (including the electronic document's location) and the established set of rights management policies. When a user attempts to open the encrypted document, the user is prompted to log in to the policy server, where the user's credentials (such as username and password) are verified against the rights management policy set up by the document author. If the rights management policies allow the user to open the encrypted document, a decryption key is sent to the user from the policy server and the electronic document can be decrypted at the user's computer, upon which the decryption key is destroyed. The electronic document can thus only be opened by users that are registered with the policy server and that are authorized by the document author to open the document.

SUMMARY

In general, in one aspect, the invention features methods and apparatus, including computer program products for controlling access to an electronic document. A document management system receives a request from a user for access to an electronic document at a user location. A rendition of the electronic document is stored in a document repository in the document management system. The user is authenticated at the document management system, to verify that the user is authorized to access the electronic document. If the user is authorized to access the electronic document, an encrypted rendition is created at the document management system, using the rendition that is stored in the document repository. A voucher including an electronic key operable to decrypt an encrypted rendition of the electronic document is created at the document management system. The electronic voucher is passed to the user location.

In general, in another aspect, the invention features methods and apparatus, including computer program products for controlling access to an electronic document. A document management system receives a request from a first user for access to an electronic document at a first user location. A rendition of the electronic document is stored in a document repository in the document management system. The first user is authenticated at the document management system, using a set of access policies for the electronic document, to verify that the first user is authorized to obtain the electronic document. If the first user is authorized to obtain the electronic document, an encrypted rendition of the electronic document is passed to the first user. The document management system then receives a request from a second user for access to the encrypted rendition. The second user is authenticated at the document management system, using the set of access policies, to establish which operations the second user is allowed to perform on the encrypted rendition. A voucher is created at the document management system. The voucher includes an electronic key for decrypting the encrypted rendition of the electronic document and the set of access policies for the electronic document. The electronic voucher is passed to a second user location.

Advantageous implementations of the invention include one or more of the following features. The encrypted rendition can be created at the document management system, using the rendition that is stored in the document repository. Creating a voucher can include obtaining the set of access policies for the second user from an access control list that is associated with the electronic document, and including the obtained set of access policies in the electronic voucher. The set of access policies for the electronic document can identify one or more of the following operations: adding content to the rendition, adding comments to the rendition, applying a digital signature to the rendition, saving the rendition, printing the rendition, importing form data into the rendition, exporting form data from the rendition, and transmitting the rendition to another user.

A list of application rights can be included in the electronic voucher prior to passing the electronic voucher to the second user location. Expiration information can be included in the electronic voucher prior to passing the electronic voucher to the second user location. The expiration information can include one or more of: a predetermined number of access operations before the voucher expires, a particular time period before the voucher expires, and a particular time when the voucher expires. Providing the encrypted rendition can include providing the encrypted rendition from a location other than the document repository. Providing the encrypted rendition can include providing the encrypted rendition from the first user location. The rendition can be a Portable Document Format document. Information relating to the request can be recorded in an audit trail for the electronic document. The first and second user can be the same individual. The first user location and the second user location can be identical.

In general, in another aspect, the invention features methods and apparatus, including computer program products for accessing an electronic document. Access to an electronic document from a document management system is requested at a user location. One or more renditions of the electronic document are stored in a document repository in the document management system. An electronic voucher for the electronic document is received at the user location. The electronic voucher is issued by the document management system and includes an electronic key for decrypting an encrypted rendition of the electronic document. The electronic key of the electronic voucher is used at the user location to decrypt the encrypted rendition of the electronic document.

Advantageous implementations of the invention include one or more of the following features. It can be determined whether the encrypted rendition of the electronic document is available at the user location. If it is determined that the encrypted rendition is available at the user location, requesting access can include: extracting from the encrypted rendition a reference to the document repository where one or more renditions of the electronic document are stored; and requesting access to the rendition from the document repository identified by the extracted reference. The encrypted rendition can include a document identifier and the reference to the document repository can include a path for accessing the document repository over a computer network. Requesting access can include retrieving the document identifier and the path from the encrypted rendition and sending an access request to the document repository specified by the retrieved path, the access request including the document identifier.

The electronic voucher can include a set of access policies for the electronic document. It can be verified, at the user location, that one or more requested operations are allowed by the set of access policies for the electronic document. The set of access policies can be a set of access policies that resides in the document repository and specifies access rights to the electronic document. The received voucher can be stored at the user location. Receiving an electronic voucher can include determining whether an electronic voucher is stored locally at the user location and, if the electronic voucher is stored locally, retrieving the electronic voucher from the local storage; if the electronic voucher is not stored locally, requesting an electronic voucher from the document management system. An encrypted rendition of the electronic document can be received.

The invention can be implemented to realize one or more of the following advantages. Sophisticated control over who may access renditions of electronic documents can be achieved. The access control can be extended to times after which an electronic document has left the document repository, and is not limited to when the electronic document resides in the document repository. The access policies that are already part of the document management system can be used. Since the access policies of the document repository are used, an administrator does not have to learn how to administer a separate policy server, back up its data, and so on. Consequently, there is no need for a separate set of rights management policies, which is the case in conventional document management applications. Since no separate rights management policies need to be defined, the access policies for an electronic document are always up to date, that is, as soon as an access policy changes for an electronic document in the document repository, the changes will also affect any rendition that has been accessed and stored locally at a user's location. It is also possible to track data relating to an electronic document in the repository—for example, an audit trail can be created recording when the document was accessed, from where, by whom, and so on.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

The invention provides functionality by which access controls for an electronic document can be extended to times after a rendition of the electronic document has been provided to and decrypted by a user.

Figure 1:
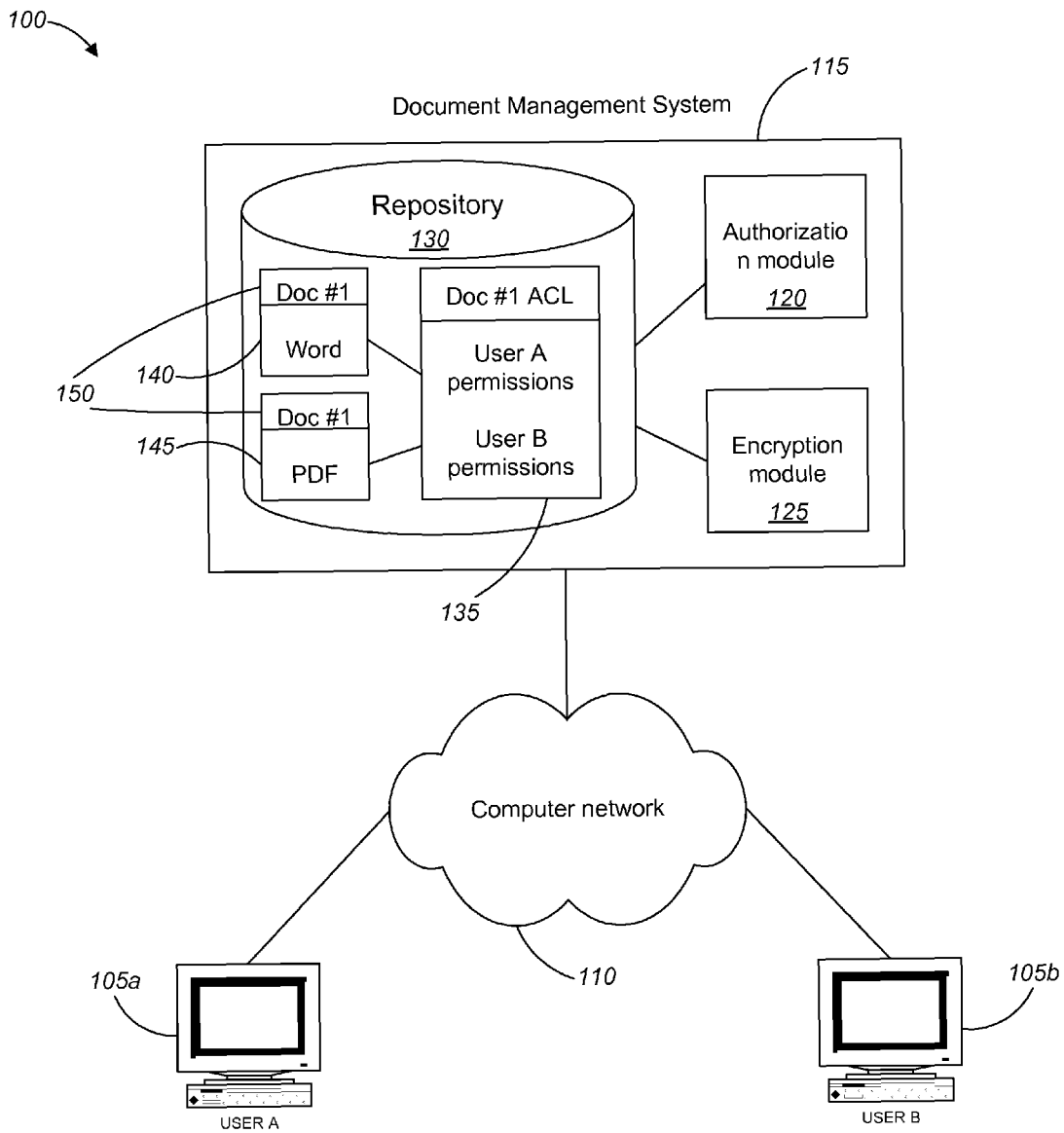
FIG. 1 is a schematic diagram showing a system for access to electronic documents in a document management system.

As can be seen in FIG. 1, a system (100) for access to electronic documents in a document management system includes a document management system (115) to which two user clients, User A (105*a*) and User B (105*b*), are connected through a computer network (110), such as a local area network (LAN) or the Internet. It should be noted that for simplicity only two clients (105*a*, 105*b*) are shown, while in a real situation several tens or hundreds of clients may be connected to the document management system (115) through the computer network (110). The clients (105*a*, 105*b*) have software, which will be described in further detail below with reference to FIG. 3, for communicating over the computer network (110) with the document management system (115) and for accessing or otherwise processing electronic documents of one or more types that reside in the document management system (115).

The document management system (115) includes an authorization module (120) that contains functionality for receiving user credentials (for example, a username and a password) from the clients (105*a*, 105*b*), verifying the received credentials, and creating a user identity that can be used by the document management system (115) to determine what permissions a user has with regards to a particular electronic document to which the user requests access. The document management system (115) also includes a document repository (130) in which renditions of electronic documents (140, 145) are stored.

As was described above, the document repository (130) is a secure computer storage location, such as a server in which a library of electronic documents (140, 145) are kept and maintained in an organized way, so that they can be accessed and searched efficiently, regardless of the source or format of the individual electronic documents in the library. The document repository (130) may be a single central location or be distributed among several physical locations. Normally, thousands of electronic documents are stored in the document repository (130), but for simplicity FIG. 1 only shows two renditions of a single electronic document (a word processing rendition (140) and a PDF rendition (145)). Each of the two renditions of the electronic document is identified by a document ID (150), which is the same for the two renditions.

The document repository (130) also includes an ACL (135) for each access-controlled electronic document. In other implementations, several access-controlled electronic documents may share the same ACL (135), or multiple access control lists can be associated with a single electronic document (for example, a separate ACL for each of two different renditions of the electronic document). FIG. 1 only shows one ACL (135), since the document repository (130) only includes one electronic document. The ACL (135) is associated with its electronic document through the document ID (150), and is shared between the different renditions (140, 145) of the electronic document, and is separate from the electronic document itself. The ACL (135) for the electronic document contains a mapping between user identities and a set of access policies. The access policies in the set of access policies may be different for different users and the set of access policies thus defines what permissions, if any, each identified user has. The access policies will be discussed in further detail below with reference to FIGS. 2 and 3. In the implementation shown in FIG. 1, the ACL (135) is stored in the document repository (130), but it should be noted that the ACL (135) can be stored anywhere in the document management system (115).

Finally, the document management system (115) also includes an encryption module (125). The encryption module (125) contains functionality for obtaining and encrypting renditions of electronic documents from the document repository (130). The encryption module (125) can use any number of conventional encryption methods, such as symmetric keys, public/private keys, or a third party encryption scheme via a security handler plugin. As will be seen below with reference to FIGS. 2 and 3, the encryption module also contains functionality for issuing vouchers to the clients (105*a*, 105*b*) and for "tethering" renditions of electronic documents to the document management system (115). As will be seen below, tethering electronic documents to a document management system refers to creating an association between the electronic documents and their document management system, such that the document management system must be contacted, and access control mechanisms applied, whenever access is attempted to a rendition of a tethered electronic document. Next, the operation of the system (100) will be explained in further detail.

Figure 2:
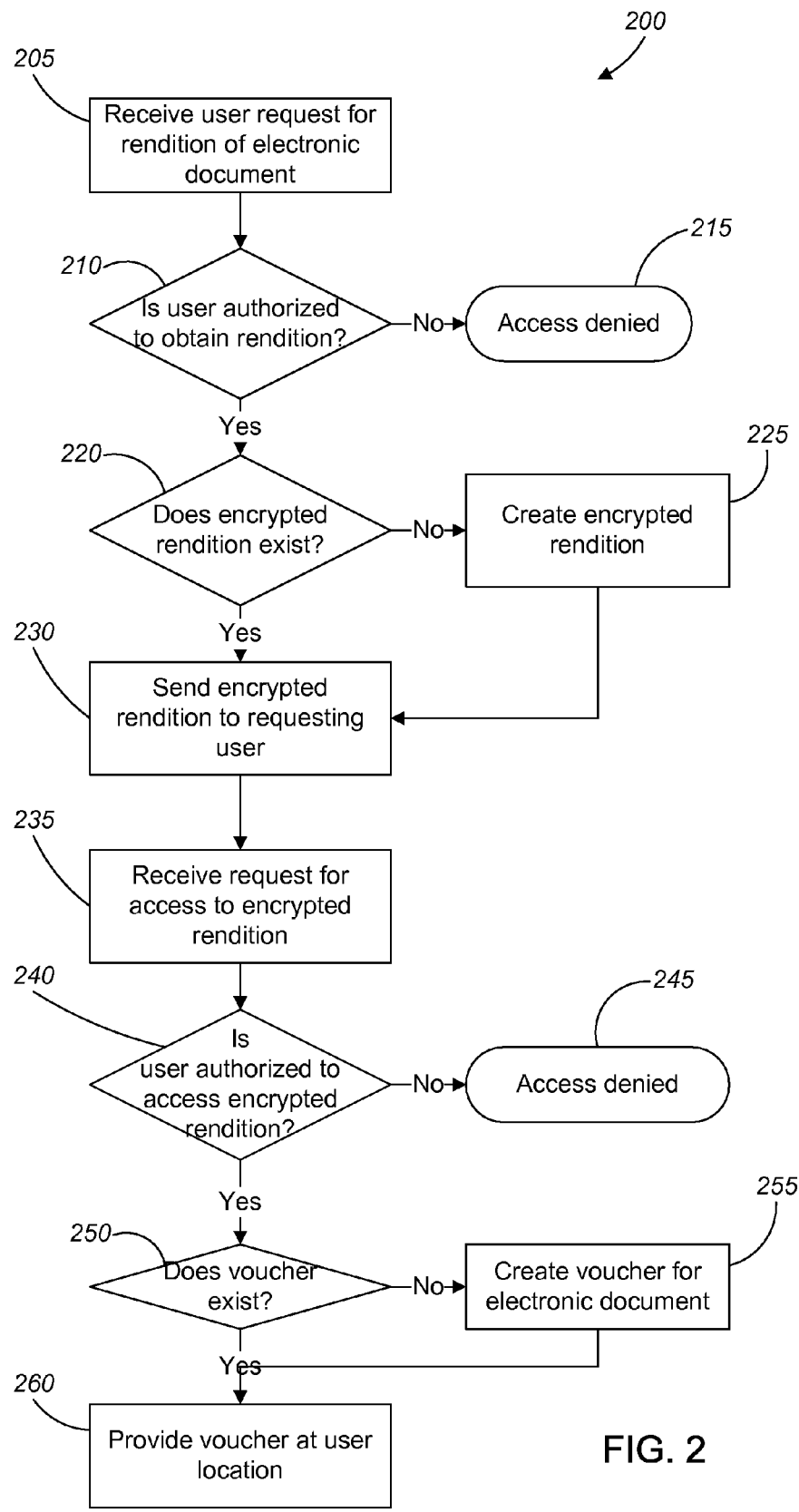
FIG. 2 is a flowchart showing a method for providing access-controlled content to a user.

As can be seen in FIG. 2, a process (200) for providing an access-controlled electronic document to a user starts by receiving a user request for a rendition of an electronic document (step 205). The request can, for example, be sent by the user client (105*a*, 105*b*) over the computer network (110) from a location that is physically different from the location of the document repository (130). The rendition (140, 145) that the user (105*a*, 105*b*) requests can be located in the document repository (130), or can be located in the different place, such as on a different server, or even on the user's hard drive. When the document management system (115) receives the request, the authorization module (120) checks whether the particular user (105*a*, 105*b*) that is requesting the rendition (140,145) is authorized to obtain the rendition (step 210). If the user is not allowed to obtain the rendition, the document repository (130) denies access (step 215) and sends an error message to the user saying that access to the requested rendition of the electronic document has been denied.

However, if the user is authorized to obtain the rendition, the process continues to step 220 and checks whether an encrypted rendition of the electronic document exists. In one implementation, the process first checks whether there is an encrypted rendition on the user's hard drive, and if no such encrypted rendition exists, the process checks whether there is an encrypted rendition in the document repository (130). If an encrypted rendition does not exist, the process creates an encrypted rendition of the electronic document (step 225) using the encryption module (125). As was discussed above, the encrypted rendition of the electronic document can be created using conventional symmetric public private key encryption techniques, or any other type of encryption technique that is suitable for encrypting electronic documents. In addition to encrypting the electronic document, the encryption process also incorporates tethering information into the encrypted rendition. The tethering information identifies the electronic document and the document repository (130) and can include, for example, the document ID (150) for the electronic document and the path to the electronic document repository (130). The original location of the rendition of the electronic document (i.e. the document repository (130) from which the rendition of the electronic document was obtained) can thus be uniquely identified when a user later tries to access the encrypted rendition of the electronic document, such that the access policies at the document repository can be used to determine whether the user is allowed to access the rendition of the electronic document. Because the tethering information is incorporated into the requested rendition, the rendition remains associated with, and subject to the access control mechanisms of, the document repository (130). After the process has verified that an encrypted rendition exists, or has created an encrypted rendition if no encrypted rendition is present at the user location, the process sends the encrypted rendition to the user (step 230).

Next, the process receives a request from a user for access to the rendition (step 235). The user can be the same user that obtained the rendition, or another user who, in some other way, has received the rendition from the user who originally obtained the rendition. Accessing the rendition can mean a number of things, such as viewing some or all of the rendition, making a copy of the rendition, or generating a new rendition of a different type, editing the rendition, printing the rendition, and so on. The process checks whether the user requesting access to the encrypted rendition is authorized to access the encrypted rendition (step 240), using the set of access policies for the electronic document. If the user is not allowed to obtain the rendition, the document repository (130) denies access (step 245) and sends an error message to the user saying that access to the requested rendition of the electronic document has been denied.

If the user is authorized to access the encrypted rendition, the process checks whether a voucher exists for the electronic document (step 250). The voucher is associated with the electronic document through the document ID, and includes the decryption key for decrypting the rendition and, optionally, a set of user permissions that specify what operations a user is permitted to perform on the rendition after the rendition has been decrypted. In one implementation, the user permissions correspond to the access policies for the user identity in the ACL (135), for example, User A (105*a*) may be allowed to view and print the electronic document, while User B (105*b*) can only view the electronic document, and so on. If user permissions are included in the electronic voucher, the user permissions are validated when the requested rendition of the electronic document is accessed on the user's computer, which will be described in further detail below with reference to FIG. 3. If a voucher already exists, the existing voucher is provided at the user location (step 260)—for example, a voucher stored in the document repository can be sent to the user location, or a voucher stored or cached at the user location can be retrieved from memory. If no voucher exists for the electronic document, the document repository creates an electronic voucher including the decryption key and the user permissions for the requested rendition of the electronic document (step 255). The voucher is then provided the user location.

In some implementations, the voucher is stored in the document repository after the voucher has been generated, while in other implementations no voucher is stored in the document repository, so that a new voucher must be generated every time a user requests access to a rendition of an electronic document that is tethered to the document repository. The voucher may also be stored in the document repository only for a limited time after the voucher has been generated, for example, until the voucher is accessed. Some implementations may allow the voucher to be stored at the user's computer, such that the access control and user permissions can be enforced even if a user works off-line and is unable to connect to the document management system. Independent of where the voucher is stored, it can be provided with expiration information, so that the voucher only remains valid for a certain time period, or for a certain number of access operations after the voucher has been received by the user. In one implementation, the document management system (115) can track which users have which vouchers. When there has been a change to the access policies for an electronic document, the document management system (115) can revoke all outstanding vouchers for the corresponding electronic document. As a result, every user that had a voucher revoked will have to request a new voucher, with the new user permissions, the next time they try to access the electronic document.

Figure 3:
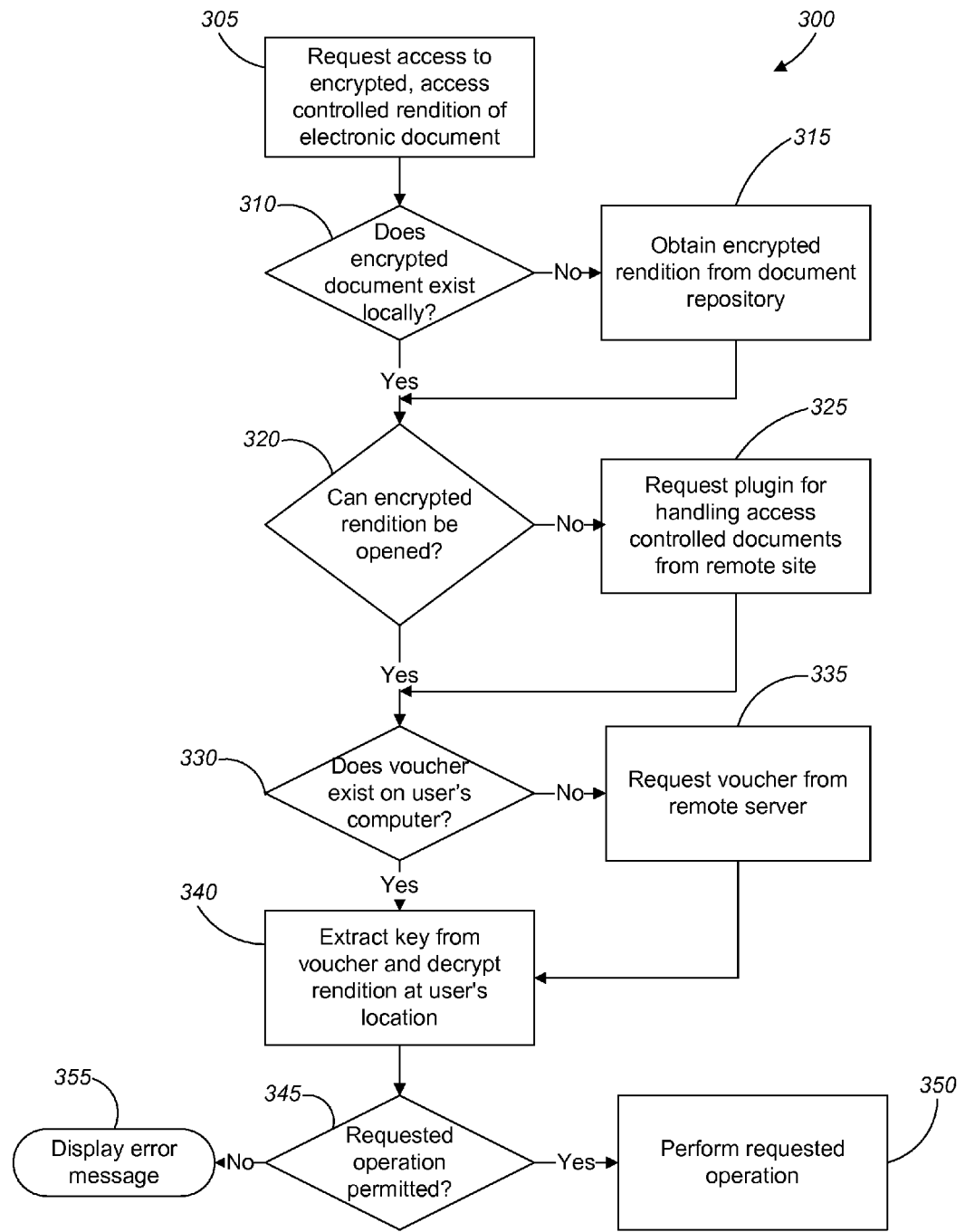
FIG. 3 is a flowchart showing a method for accessing access-controlled content at a user location.

FIG. 3 describes in greater detail the operations that occur on the user's computer (105*a*, 105*b*) when a user requests access to a rendition of an access-controlled electronic document. As can be seen in FIG. 3, the process 300 starts with a user requesting access to a rendition of an access-controlled electronic document (step 305). For example, the user may try to view a PDF document from a document repository in a document viewer application, such as Adobe® Acrobat®, or Adobe® Acrobat Reader®, on his or her computer (105*a*, 105*b*).

The rendition may be located in the document repository (130) and be encrypted or unencrypted. Alternatively, the rendition may be encrypted and stored at a different location, such as the user's hard drive (which is typically the situation if the user has obtained a rendition of the electronic document from the document repository or from another source at a prior time). The process therefore checks whether an encrypted rendition exists on the user's computer (step 310). If no encrypted rendition exists on the user's computer, the process obtains an encrypted rendition from the document repository (step 315), as was described above with reference to FIG. 2. If there already is an encrypted rendition on the user's computer, the process continues to step 320, which will be described next.

Once the process has verified that an encrypted rendition exists on the user's computer, the process checks whether the encrypted rendition can be opened on the user's computer (step 320). For example, the encrypted rendition may contain a name of a particular security handler plugin that is needed in order to open the encrypted rendition. Upon attempting to open the rendition, the document viewer application on the user's computer can read the name of this security handler plugin, and check whether such a security handler plugin has been loaded onto the user's computer. This security handler plugin contains the necessary functionality for handling encrypted renditions of electronic documents and vouchers, including reading the tethering information that is included in the encrypted rendition, and for enforcing any user permissions that may be included in the voucher, as described above. In this implementation, if the security handler plugin is not present, the security handler plugin is requested and obtained from a remote site, for example, www.adobe.com (step 325).

When the process has confirmed that document viewer application has the necessary capability, the document viewer application checks whether a voucher corresponding to the electronic document is already available locally on the user's computer (step 330). This check can be performed, for example, by retrieving the tethering information from the encrypted rendition (which is incorporated into the encrypted rendition in unencrypted form) and comparing the retrieved document ID that is part of the tethering information to document IDs in the available vouchers. If no appropriate voucher is present, the document viewer application uses the tethering information to request a voucher from the remote site address that is identified by the tethering information. This remote site address can for example represent the document repository (130) where the voucher was generated and/or is stored (step 335). In response to the request for a voucher, the document management system (115) verifies that the user is authorized to access the electronic document (by again authenticating the user identity and verifying the identity against the access policies) and, if so, returns an appropriate voucher to the document viewer application at the user's computer, as described above with reference to FIG. 2. The voucher includes a decryption key and can also include user permissions that specify what operations are authorized for the user in accordance with the access policies for the electronic document.

After the process has verified that a voucher exists for the electronic document on the user's computer, either by locating a stored voucher (as determined in step 330), or by downloading the voucher from a the document management system (115) in response to the request performed in step 335, the document viewer application extracts the decryption key from the voucher and decrypts the encrypted rendition at the user location (step 340).

After the rendition has been decrypted in step 340, whenever the user tries to perform an operation on the rendition, the proposed operations are checked against the user permissions (if any) in the voucher (step 345). The user permissions can identify allowed operations that a user may perform on the requested rendition after decrypting the rendition. For example, the user permissions can state that a particular user can perform all, or maybe only a few, of the following operations: adding content to the rendition, adding comments to the rendition, applying a digital signature to the rendition, saving the rendition, printing the rendition, importing form data into the rendition, exporting form data from the rendition, and transmitting the rendition to another user. It should be understood that these operations are not a complete list of available operations that may be controlled by the user permissions, but that other operations that can be performed on electronic documents can also be included in the user permissions.

If the requested operation is not permitted, an error message is displayed, and the user is prevented from performing the requested operation (step 355). On the other hand, if requested operation is permitted, the operation is performed (step 350). Thus, the proposed operations are carried out only if the user permissions in the voucher allow the proposed operations to be performed.

As can be seen from above, a voucher with a decryption key is required to access a rendition of an access-controlled electronic document. This voucher can only be issued by the document management system (115), or some other authorized entity whose contact information is retrieved from the encrypted electronic document by the document viewer application. Consequently, an unauthorized user cannot access the rendition of the electronic document, even if the unauthorized user obtains an encrypted rendition, since the voucher with the decryption key is only issued to users listed in the ACL (135) that is associated with the electronic document in the document repository (130), and only for the user permissions associated with the respective user identities in the ACL (135).

In some implementations, the document management system (115) can track some or all actions that occur with respect to access-controlled documents. Each time the document management system is contacted to permit access to an access-controlled electronic document, the document management system can record the time, the identity and location of the user, the identity of the document, and any operations requested or performed. This can include tracking requests for access to such documents, including identifying users initiating such requests, when the requests were made, and from what location, as well as tracking when documents are viewed, copied, edited, printed, and the like, by whom, when and at what location, such that an audit trail for the electronic document is created.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular implementations. Other implementations are within the scope of the following claims. For example, the steps of the invention can be performed in a different order and still achieve desirable results. The encryption of the rendition of the electronic document can happen at any point in time prior to passing the rendition of the electronic document to the user. The voucher can contain additional information, for example, application activation information that can be used to enable disabled operations in a document viewer application. Different types of security handler plugins can be used for different renditions of electronic documents or for different application viewers.

What is claimed is:

1. A method performed in a document management system of controlling access to an electronic document, comprising:

receiving at a document management system a request from a first user for an electronic document at a first user location, the document management system storing a rendition of the electronic document in a document repository, the document management system maintaining a set of access policies for the electronic document, the set of access policies including access policies for a plurality of users, the document having multiple renditions, the access policies applying to the document and the multiple renditions of the document;

authenticating, using one or more processors, the first user at the document management system using the set of access policies for the electronic document;

verifying that the first user is authorized to obtain the electronic document, and then passing an encrypted rendition of the electronic document to the first user, the encrypted rendition of the electronic document including tethering information;

receiving at the document management system a request from a second user for access to the encrypted rendition, where the second user received the encrypted rendition from the first user;

authenticating the second user at the document management system, using the tethering information and the set of access policies, to establish which operations the second user is allowed to perform on the encrypted rendition;

creating, at the document management system, a voucher for accessing the encrypted rendition, the voucher including the set of access policies for controlling access to the encrypted rendition of the electronic document, the voucher further including an electronic key operable to decrypt the encrypted rendition of the electronic document; and passing the electronic voucher to the second user located at a second user location.

2. The method of claim 1, where each user has an identity on the document management system and where the document management system authenticates users based on the user's identities.

3. The method of claim 1, further comprising:
modifying the set of access policies; and
when a request for access to the encrypted rendition is received, authenticating the request using the modified set of access policies.

4. The method of claim 1, further comprising:
creating, at the document management system, the encrypted rendition using the rendition that is stored in the document repository.

5. The method of claim 1, wherein the set of access policies for the electronic document identify one or more of the following operations:
adding content to the rendition, adding comments to the rendition, applying a digital signature to the rendition, saving the rendition, printing the rendition, importing form data into the rendition, exporting form data from the rendition, and transmitting the rendition to another user.

6. The method of claim 1, where the set of access policies include:
a list of application rights.

7. The method of claim 1, further comprising:
including expiration information in the electronic voucher prior to passing the electronic voucher to the second user location.

8. A computer program product, tangibly embodied in a machine-readable storage device, for controlling access to an electronic document, comprising instructions operable to cause a programmable processor to:

receive at a document management system a request from a first user for an electronic document at a first user location, the document management system storing a rendition of the electronic document in a document repository, the document management system maintaining a set of access policies for the electronic document, the set of access policies including access policies for a plurality of users, the document having multiple renditions, the access policies applying to the document and the multiple renditions of the document;

authenticate the first user at the document management system using the set of access policies for the electronic document;

verify that the first user is authorized to obtain the electronic document, and then pass an encrypted rendition of the electronic document to the first user, the encrypted rendition of the electronic document including tethering information;

receive at the document management system a request from a second user for access to the encrypted rendition, where the second user received the encrypted rendition from the first user;

authenticate the second user at the document management system using the tethering information and the set of access policies to establish which operations the second user is allowed to perform on the encrypted rendition;

create, at the document management system, a voucher for accessing the encrypted rendition, the voucher including the set of access policies for controlling access to the encrypted rendition of the electronic document, the voucher further including an electronic key operable to decrypt the encrypted rendition of the electronic document; and pass the electronic voucher to the second user located at a second user location.

9. The computer program product of claim 8, where each user has an identity on the document management system and where the document management system authenticates users based on the user's identities.

10. The computer program product of claim 8, where the instructions to create a voucher comprise instructions to:
   modify the set of access policies; and
   when a request for access to the encrypted rendition is received, authenticate the request using the modified set of access policies.

11. The computer program product of claim 8, further comprising instructions to:
   create, at the document management system, the encrypted rendition using the rendition that is stored in the document repository.

12. The computer program product of claim 8, wherein the set of access policies for the electronic document identify one or more of the following operations:
   adding content to the rendition, adding comments to the rendition, applying a digital signature to the rendition, saving the rendition, printing the rendition, importing form data into the rendition, exporting form data from the rendition, and transmitting the rendition to another user.

13. The computer program product of claim 8, where the set of access policies include:
   a list of application rights.

14. The computer program product of claim 8, further comprising instructions to:
   include expiration information in the electronic voucher prior to passing the electronic voucher to the second user location.

15. A system comprising:
   one or more processors configured to perform operations including:
   receiving at a document management system a request from a first user for an electronic document at a first user location, the document management system storing a rendition of the electronic document in a document repository, the document management system maintaining a set of access policies for the electronic document, the set of access policies including access policies for a plurality of users, the document having multiple renditions, the access policies applying to the document and the multiple renditions of the document;

authenticating the first user at the document management system using the set of access policies for the electronic document;

verifying that the first user is authorized to obtain the electronic document, and then pass an encrypted rendition of the electronic document to the first user, the encrypted rendition of the electronic document including tethering information;

receiving at the document management system a request from a second user for access to the encrypted rendition, where the second user received the encrypted rendition from the first user;

authenticating the second user at the document management system using the tethering information and the set of access policies to establish which operations the second user is allowed to perform on the encrypted rendition;

creating, at the document management system, a voucher for accessing the encrypted rendition, the voucher including the set of access policies for controlling access to the encrypted rendition of the electronic document, the voucher further including an electronic key operable to decrypt the encrypted rendition of the electronic document; and passing the electronic voucher to the second user located at a second user location.

16. The system of claim 15, where each user has an identity on the document management system and where the document management system authenticates users based on the user's identities.

17. The system of claim 15, where creating a voucher includes:
   modifying the set of access policies; and
   when a request for access to the encrypted rendition is received, authenticating the request using the modified set of access policies.

18. The system of claim 15, further operable to perform operations comprising:
   create, at the document management system, the encrypted rendition using the rendition that is stored in the document repository.

19. The system of claim 15, wherein the set of access policies for the electronic document identify one or more of the following operations:
   adding content to the rendition, adding comments to the rendition, applying a digital signature to the rendition, saving the rendition, printing the rendition, importing form data into the rendition, exporting form data from the rendition, and transmitting the rendition to another user.

20. The system of claim 15, where the set of access policies include:
   a list of application rights.

21. The system of claim 15, further operable to perform operations comprising:
   include expiration information in the electronic voucher prior to passing the electronic voucher to the second user location.

* * * * *